United States Patent Office 3,498,006
Patented Mar. 3, 1970

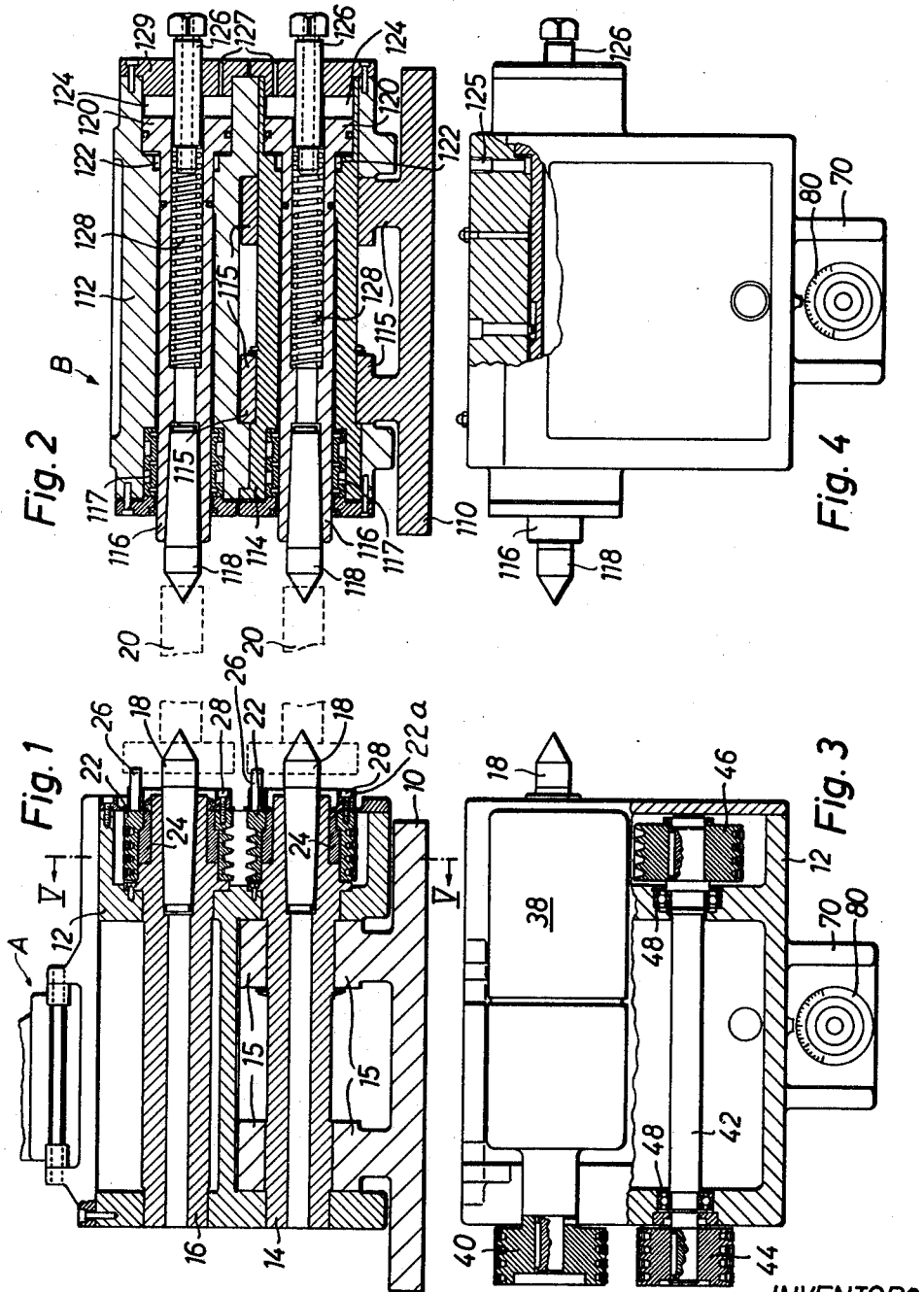

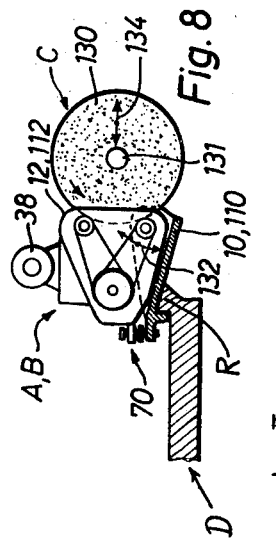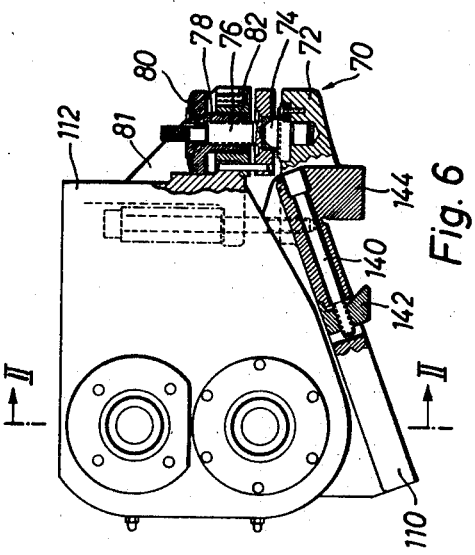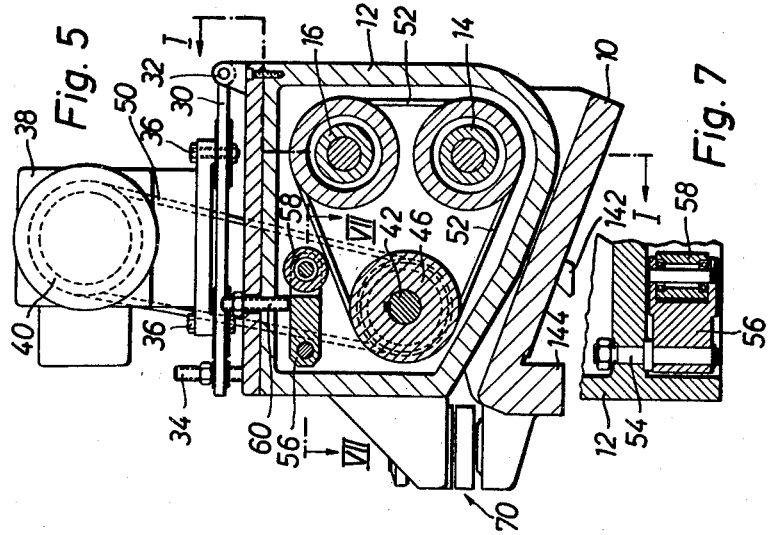

3,498,006
MACHINE TOOL FOR SIMULTANEOUSLY
TREATING SEVERAL WORKPIECES
Walter Lang, Dusseldorf, and Wendelin Rehbein and Hans
Appel, Remscheid, Germany, assignors to Gebrueder
Honsberg, Remscheid-Hasten, Germany
Filed Oct. 10, 1967, Ser. No. 674,136
Claims priority, application Germany, Oct. 13, 1966,
H 60,743
Int. Cl. B24b 5/00, 41/06
U.S. Cl. 51—105                                        23 Claims

ABSTRACT OF THE DISCLOSURE

A machine tool having a headstock and a tailstock, both affixed to a frame, and a tool holder for a rotary tool reciprocably supported by the frame for movement toward and away from the common vertical plane of axes of two pairs of work spindles mounted in the housings of the headstock and tailstock. The housings are pivotable about the common axis of the two lower spindles by adjusting devices provided on the headstock and tailstock. The workpieces which are held by centers of the spindles or by chucks which are rotatable in the spindles of the headstock can be driven through the intermediary of the chucks or by eccentric pins mounted on pulleys which are rotatably supported by the spindles of the headstock.

BACKGROUND OF THE INVENTION

The present invention relates to machine tools in general, and more particularly to improvements in machine tools for treatment of revolving workpieces, preferably by means of rotary material removing tools. Still more particularly, the invention relates to improvements in grinding, shaving, honing or like material removing machines.

In heretofore known grinding machines, it is customary to treat one workpiece with one tool at a time. Therefore, and if the work schedule requires simultaneous treatment of two or more workpieces, the manufacturing plant must have two or more machines each of which is serviced by an attendant. This is a costly procedure, not only because of the large number of man hours but also because several machines represent a substantial initial investment and occupy much floor space in addition to a high maintenance cost for a battery of two or more machines.

SUMMARY OF THE INVENTION

It is an object of our invention to provide a novel and improved machine tool wherein several rotary workpieces can be treated simultaneously by a material removing tool and which is particularly suited for treatment of rotary workpieces which are placed into material removing engagement with a rotary tool.

Another object of the invention is to provide a novel and improved headstock for a machine tool of the just outlined character.

A further object of the invention is to provide the machine tool with a novel and improved tailstock.

An additional object of the invention is to provide the machine tool with novel adjusting devices for the work-engaging parts of the headstock and tailstock.

Still another object of the invention is to provide a machine tool for treatment of rotary workpieces whose output is higher than the output of presently known machine tools.

Another object of our invention is to provide a machine tool which can be used as a grinding machine.

An ancillary object of the invention is to provide a machine tool which can be used for treatment of longer, shorter, smaller-diameter, larger-diameter, complicated and/or simple rotary workpieces.

A concomitant object of the invention is to provide a machine tool for simultaneous treatment of plural rotary workpieces and to equip such machine tool with novel drive means for the workpieces.

A further object of the invention is to provide the above outlined machine tool with work-engaging elements which can be adjusted by devices simple enough to be properly manipulated by semiskilled persons.

Briefly outlined, our invention is embodied in a machine tool for treatment of rotary workpieces which comprises a frame or base, a headstock and a tailstock each having a main support carried by the frame, a housing carried by the respective main support for pivotal movement about a predetermined axis, a pair of parallel work spindles in each of the housings, cooperating work-engaging portions provided on the spindles to hold a pair of workpieces between the headstock and the tailstock, one spindle in each housing having an axis which coincides with the aforementioned predetermined axis and the axes of all spindles being normally located in a common (preferably vertical) plane, drive means for rotating the workpieces about the axes of the respective spindles, and a tool holder or tool mount supported by and movable with reference to the frame in directions substantially at right angles to the aforementioned common plane so that a tool carried by the tool holder can be placed into material removing engagement with both workpieces.

The machine tool is further equipped with adjusting means for pivoting the housings with reference to the respective main supports. The work-engaging portions may be constituted by conventional centers or by chucks which can be actuated to engage or release the workpieces, preferably by means of pull rods which extend through the respective spindles.

The novel features which are considered as characteristic of the invention are set forth in particular in the appended claims. The improved machine tool itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is a longitudinal vertical sectional view of the headstock in a machine tool which embodies one form of our invention, the section being taken in the direction of arrows as seen from the line I—I of FIG. 5;

FIG. 2 is a similar vertical sectional view of the tailstock, the section being taken in the directions of arrows as seen from the line II—II of FIG. 6;

FIG. 3 is a top plan view of the headstock, with certain portions broken away;

FIG. 4 is a top plan view of the tailstock, with certain portions broken away;

FIG. 5 is a transverse vertical sectional view of the headstock as seen in the direction of arrows from the line V—V of FIG. 1;

FIG. 6 is an end elevational view of the tailstock as seen from the left-hand side of FIG. 1 or 2, with certain portions broken away;

FIG. 7 is a fragmentary horizontal sectional view as seen in the direction of arrows from the line VII—VII of FIG. 5;

FIG. 8 is a schematic smaller-scale end elevational view of the machine tool which embodies the structure shown in FIGS. 1 to 7;

DESCRIPTION OF THE PREFERRED EMBODIMENTS

Figure 9:
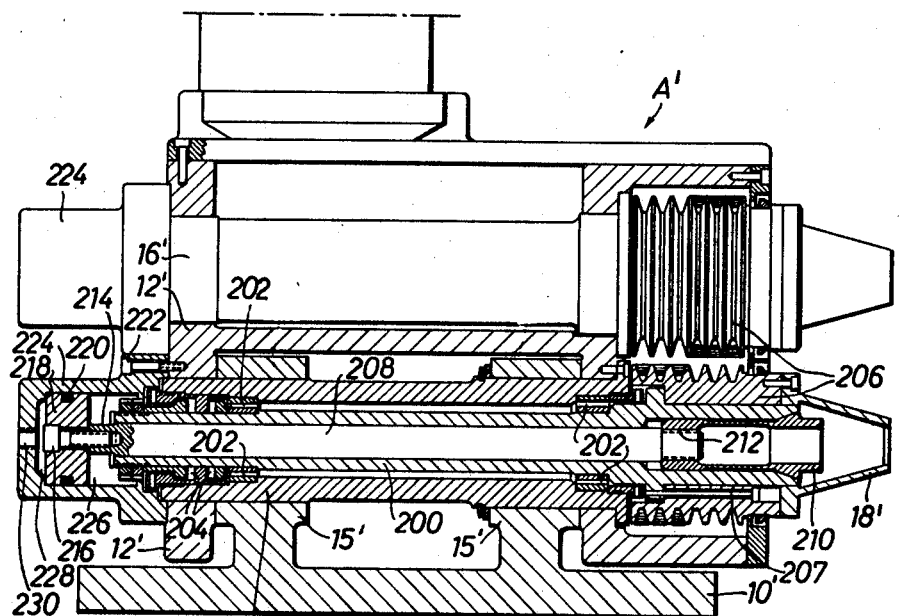
FIG. 9 is a partly elevational and partly longitudinal vertical sectional view of the headstock in a modified machine tool.

The invention will be described with reference to a grinding machine with the understanding, however, that it can be embodied in other types of machine tools wherein several rotary workpieces are treated simultaneously by a material removing tool, preferably by a revolving tool.

The machine of FIGS. 1 to 8 comprises a base or frame D (FIG. 8), a headstock A (best shown in FIGS. 1, 3, 5, and 8), a tailstock B (best shown in FIGS. 2, 4 and 6), and a tool mount or tool holder C (shown in FIG. 8) for a rotary material removing tool 130. In the illustrated embodiment, the tool 130 is a grinding wheel whose holder includes a driven horizontal shaft 131 which is reciprocable in a horizontal plane as indicated by the double-headed arrow 134 of FIG. 8. The mechanism for moving the holder C is known in the art and by itself forms no part of the present invention.

The headstock A comprises a main support or bracket 10 which can be ridgidly clamped to the frame D in a manner as shown in FIGS. 5 and 8. The bracket 10 comprises a downwardly extending flange 144 which can cooperate with a jaw 142 movable toward and away from the flange 144 by means of a feed screw similar to the feed screw 140 shown in FIG. 6 on the bracket 110 of the tailstock B. The parts 144 and 142 can engage an upwardly extending rib R of the frame D to fixedly hold the headstock A in selected position.

The bracket 10 of the headstock A supports a housing 12 which is turnable about the axis of a lower horizontal work spindle 14. The means for changing the angular position of the housing 12 with reference to the axis of the spindle 14 comprises an adjusting device 70 which will be described in detail with reference to FIG. 6. The spindle 14 is parallel with the shaft 131 of the grinding wheel 130 and with a second or upper work spindle 16 which is mounted in the housing 12 at a level above the spindle 14. The common plane of the axis of work spindles 14, 16 is usually substantially or exactly normal to the horizontal plane passing through the axis of the drive shaft 131 for the grinding wheel 130. Thus, the axes of the spindles 14, 16 are normally located in a common vertical plane.

The spindles 14, 16 are ridgidly connected to the housing 12 and the spindle 14 is rotatable in bearing sleeves 15 extending upwardly from the bracket 10 (see particularly FIG. 1). Each of these spindles carries at its right-hand end a conical center 18 for the adjoining end of a workpiece 20. The spindles 14, 16 further carry roller bearings 24 for two pulleys 22 forming part of the drive means for rotating the workpieces 20. The pulleys 22 are located in a common vertical plane and carry holders 22a for eccentric motion transmitting pins 26 which extend into suitable openings or slots in the adjoining end faces of the respective workpieces 20. The holders 22a are connected to the pulleys 22 by screws 28 or similar fasteners.

The tailstock B comprises centers 118 each of which registers with one of the centers 18. Each of the workpieces 20 is held between a center 18 and the registering center 118. When the pulleys 22 are driven by a set of V-belts 52, the pins 26 transmit motion to the workpieces 20.

FIGS. 3 and 5 show that the housing 12 further accommodates a drive shaft 42 which is mounted in antifriction bearings 48 and extends from the housing to take a pulley 44 at one end and a pulley 46 at the other end. The pulley 46 is located in the common plane of the pulleys 22. Several endless V-belts 52 are trained around the pulleys 22 and 46 to drive the workpieces 20 in response to rotation of the drive shaft 42. The latter receives motion from a prime mover here shown as a variable-speed electric motor 38 through the intermediary of a driving connection including a belt 50 which is trained around the aforementioned pulley 44 on the shaft 42 and around a further pulley 40 on the output shaft of the motor 38.

The housing 12 of the headstock A further accommodates a belt tensioning device including a lever 56 one end of which is turnable on a pivot pin 54, see FIGS. 5 and 7. The other end of the lever 56 carries a tensioning roll 58. A bolt 60 is received in a tapped bore of the housing 12 and its tip bears against the lever 56 so that the latter urges the roll 58 against the belts 52. The head of the bolt 60 is accessible at the upper side of the housing 12.

The motor 38 is affixed to a platform 30 by means of bolts 36, see FIG. 5. The platform 30 is connected to the housing 12 by a hinge 32 and its inclination can be changed by a threaded bolt 34 which meshes with the platform and rests on the housing 12. The parts 30–34 constitute a tensioning device for the belts 50.

The tailstock B comprises a main support or bracket 110 which is affixed to the frame D in the same way as the bracket 10. The feed screw 140 of FIG. 6 can move the jaw 142 toward the flange 144 of the bracket 110 to clamp the tailstock B to the rib R (FIG. 2). The bracket 110 supports a housing 112 which is turnable about the axis of a hollow cylindrical outer shaft 114 mounted in bearing sleeves 115. The shaft 114 accommodates a first or lower work spindle 116 which carries one of the centers 118. The second or upper spindle 116 is mounted in the housing 112 at a level above the lower spindle 116 and carries the other center 118. The centers 118 register with the centers 18 of the work spindles 14, 16. The spindles 116 are mounted without radial clearance in bushings 117 but are movable axially with reference to the housing 112. The rear end portions of the spindles 116 carry pistons 120 which are reciprocable in double-acting cylinders forming part of or affixed to the housing 112. The cylinders have chambers 122, 124 located at the opposite axial ends of the respective pistons 120. Channels 125 connect the front chambers 122 with a system of regulating valves (not shown), and channels 127 connect these valves with the rear chambers 124. The channels 127 are machined into a removable outer end wall 129 of the housing 112. The source of a pressure medium which can be admitted into the chambers 122, 124 to move the pistons 120 axially is not shown in FIGS. 2 and 4.

The spindles 116 are biased forwardly by helical springs 128 which operate between internal shoulders of these spindles and axially movable retainers 126 meshing with the end wall 129. The retainers 126 can regulate the bias of springs 128. The tailstock B is also provided with an adjusting device 70 which can change the angular position of the housing 112 with reference to the axis of the hollow shaft 114. One of the adjusting devices 70 is shown in FIG. 6. It comprises an arm 72 extending from the bracket 110 and supporting a vertical pin-shaped member 74 having a spherical head. The housing 112 has an arm 81 which is located above the arm 72 and supports an internally threaded outer sleeve 82 coaxially with the member 74. The outer sleeve 82 accommodates and meshes with an inner sleeve 78. The sleeve 78 is provided with external threads meshing with the threads of the outer sleeve 82 and with internal threads of different lead which mesh with a screw-shaped member 76 whose tip bears against the spherical head of the member 74. The arrangement is such that a relatively large angular displacement of the inner sleeve 78 causes a small axial movement of the member 76. Such axial movement causes angular movement of the housing 112 about the axis of the hollow shaft 114. The sleeve 78 carries a graduated scale 80 which furnishes readings indicating the angular position of the housing 112. The device 70 can move the housing 112 between two end positions and through an infinite number of intermediate positions.

The operation is as follows:

As shown in FIG. 8, the holder C is movable with reference to the frame D in directions indicated by arrow 134. The motor which drives the shaft 131 of the grinding wheel 130 is not shown. The adjusting devices 70 of the headstock A and tailstock B are manipulated to place the centers 18 into accurate registry with the corresponding centers 118. The directions in which the housings 12, 112 are pivotable by the respective adjusting devices 70 are indicated in FIG. 8 by a double-headed arrow 132. The workpieces 20 are inserted between the centers 18, 118 by moving the spindles 116 rearwardly against the opposition of resilient means 128 shown in FIG. 2 or by admitting a pressure medium into the front cylinder chambers 122 of the housing 112. The pressure medium is thereupon permitted to escape from the front chambers 122 and is admitted into the rear chambers 124 so that the workpieces 20 are held with a requisite force and rotate with the pulleys 22 in response to motion transmitted by the pins 26. The feed stroke of the grinding wheel 130 is selected in advance to determine the minimum diameters of the workpieces. The adjusting devices 70 enable the operators to insure that the diameters of finished workpieces will be identical upon completion of the grinding operation provided, of course, that the workpieces should have identical diameters. The devices 70 also permit adjustments which might be necessary due to different heat expansion of parts on the headstock A and tailstock B. The machine tool is then ready for operation and the wheel 130 removes material from the workpieces 20 as it advances in a direction to the left, as viewed in FIG. 8. Finished workpieces are removed upon retraction of the grinding wheel 130 and upon admission of a pressure medium into the front chambers 122 of the housing 112.

FIG. 9 illustrates the headstock A' of a modified machine tool. The main difference between the embodiments of FIGS. 1–8 and 9 is that the headstock A' comprises chucks 210 which replace the centers 18 and the motion transmitting pins 26. The bracket 10' of the headstock A' is provided with bearing sleeves 15' for the lower work spindle 14' which is rigidly installed in the housing 12'. The upper work spindle is shown at 16'. The lower work spindle 14' accommodates a hollow shaft 200 which is rotatable in radial bearings 202 and thrust bearings 204. The shaft 200 is connected with a pulley 206 by means of screws 207 or similar fasteners. This shaft 200 accommodates an axially movable actuating member or pull rod 208 whose forward end (i.e., the right-hand end, as viewed in FIG. 9) is externally threaded, as at 212, to take the chuck 210. An extension 214 at the rear or left-hand end of the pull rod 208 is internally threaded to receive a screw 216 serving to secure to the pull rod 208 a piston 218 having a piston ring 220 and being reciprocable in a double-acting cylinder 224 on the housing 12'. The cylinder 224 is affixed to the housing 12' by screws or bolts 222. The cylinder 224 and piston 218 define two cylinder chambers 226, 228 which are connected to a source of pressure medium by means of suitable conduits and valves. The conduit which admits or evacuates pressure medium from the chamber 228 is shown at 230. When the pull rod 208 is caused to move in a direction to the left (in response to admission of pressure medium into the chamber 226), a workpiece which has been inserted into the chuck 210 is clamped and rotates in response to rotation of the hollow shaft 200. The numeral 18' denotes a guide which facilitates insertion of workpieces into the chuck 210. The structure for holding workpieces in the chuck of the upper work spindle 16' of the headstock A' is the same as the structure shown in the lower part of FIG. 9.

Figure 10:
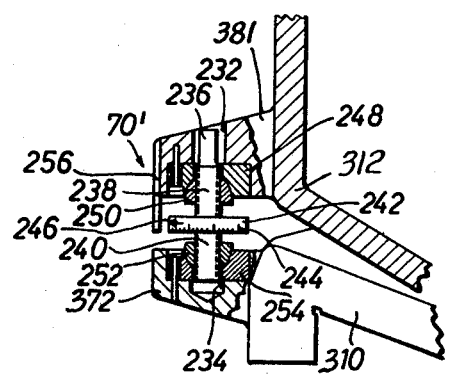
FIG. 10 is a sectional view of a modified adjusting device which is employed to change the position of the housing with reference to the main support of the headstock or tailstock in our machine tool.

FIG. 10 illustrates a modified adjusting device 70' which can be used to change the angular position of the housing in the headstock and/or tailstock of our machine tool. The bracket 310 (which is assumed to form part of a headstock) is provided with an arm 372 having a vertical bore 234 in registry with a vertical bore 232 in an arm 381 of the housing 312. The bores 232, 234 accommodate a threaded member 236 having a collar or knob 242 substantially midway between the arms 372 and 371. The peripheral surface of the collar 242 carries a graduated scale 244 cooperating with an index or pointer 256 on the arm 381. The scale 244 is further provided with a marker 246. The lead of threads 238 on the member 236 above the collar 242 is different from the lead of threads 240 on the member 236 below the collar. The arms 372, 381 respectively accommodate sockets 254, 248 which surround the respective portions of the member 236 and have concave seats for spherical members 252, 250 whose internal threads respectively mesh with the threads 240, 238. The index 246 has a graduated vertical scale whose graduations can be pinpointed by the marker 246 on the scale 244. The upper end of the rotary member 236 is slotted or is provide with a polygonal head to facilitate its rotation by means of a screwdriver or another readily available tool.

When the member 236 is rotated, the distance between the arms 372, 381 changes due to difference between the leads of threads 238, 240. This causes an angular displacement of the housing 312 with reference to the bracket 310. The extent of such displacement can be read on the scale of the pointer 256. The pointer 256 and collar 242 render it possible to detect very small changes in angular position of the housing 312.

An important advantage of our machine tool over presently known machine tools is that the time required for treatment of a predetermined number of workpieces is reduced almost in half. This is due to the fact that our machine tool can treat two rotary workpieces at the same time and that such workpieces can be treated by a single rotary tool or by a battery of coaxial tools. The machine tool of our invention is particularly useful in mass production of articles which rotate during removal of surplus material by rotary tools. Substantial savings can be achieved in salaries for attendants because a person supervising the operation of our machine tool replaces the attendants in charge of two conventional machine tools. The utilization of our machine tool brings about substantial savings in floor space, initial cost and maintenance cost.

Our machine tool is susceptible of many additional modifications without departing from the spirit of the invention.

Without further analysis, the foregoing will so fully reveal the gist of the present invention that others can, by applying current knowledge, readily adapt it for various applications without omitting features which fairly constitute essential characteristics of the generic and specific aspects of our contribution to the art.

What is claimed as new and desire to be protected by Letters Patent is set forth in the appended claims.

We claim:

1. A machine tool for treatment of rotary workpieces, comprising a frame; a headstock and a tailstock each having a main support carried by said frame, a housing carried by the respective main support for pivotal movement about a predetermined axis, and a pair of parallel work spindles in each of said housings, said spindles having cooperating work-engaging portions to hold a pair of workpieces between said headstock and said tailstock and one spindle in each housing having an axis coinciding with said predetermined axis, the axes of all said spindles being normally located in a common plane; drive means for rotating the workpieces about the axes of the respective spindles; and a tool holder supported by and movable with reference to said frame in directions substantially at right angles to said common plane so that a tool carried by said tool holder can be placed into material removing engagement with the workpieces carried by said spindles.

2. A machine tool as defined in claim 1, further comprising a pair of adjusting means for pivoting said housings about said predetermined axis.

3. A machine tool as defined in claim 1, wherein said drive means is provided on said headstock and wherein said common plane is a vertical plane, said tool holder comprising means for rotating the tool about an axis which is parallel with said predetermined axis.

4. A machine tool as defined in claim 1, wherein said drive means comprises coplanar first and second pulleys mounted on the spindles of said headstock, a drive shaft rotatably mounted in the housing of said headstock for rotation about an axis which is parallel with said predetermined axis, a third pulley mounted on said shaft and coplanar with said first and second pulleys, endless belt means trained around said pulleys, a prime mover, a driving connection between said prime mover and said shaft, and motion transmitting means driven by said first and second pulleys to rotate the workpieces between said spindles in response to rotation of said shaft.

5. A machine tool as defined in claim 4, wherein said prime mover is a motor mounted on the housing of said headstock and said driving connection comprises a belt drive.

6. A machine tool as defined in claim 5, wherein said motor comprises an output shaft and said belt drive comprises pulleys mounted on said shafts and second endless belt means trained around said last mentioned pulleys, and further comprising tensioning means for said second belt means including a platform hingedly secured to the housing of said headstock and supporting said motor and means for changing the position of said platform with reference to said last mentioned housing.

7. A machine tool as defined in claim 4, wherein said first and second pulleys are rotatable on the respective spindles of said headstock and said motion transmitting means comprise eccentric pins carried by said first and second pulleys.

8. A machine tool as defined in claim 1, wherein said work-engaging portions of said spindles are centers.

9. A machine tool as defined in claim 1, wherein said tailstock further comprises a hollow shaft receiving the one spindle of said tailstock and rigid with the respective housing, the main support of said tailstock comprising bearing means rotatably receiving said hollow shaft.

10. A machine tool as defined in claim 1, wherein the spindles of said tailstock are movable axially with reference to the respective housing.

11. A machine tool as defined in claim 10, wherein the housing of said tailstock comprises bushings arranged to hold the respective spindles against radial movement.

12. A machine tool as defined in claim 10, wherein said tailstock comprises double-acting fluid-operated cylinder and piston means for moving the respective spindles axially.

13. A machine tool as defined in claim 10, wherein said tailstock further comprises resilient means for biasing the respective spindles axially toward the spindles of said headstock.

14. A machine tool as described in claim 13, wherein said tailstock further comprises means for regulating the bias of said resilient means.

15. A machine tool as defined in claim 2, wherein at least one of said adjusting means comprises a first member supported by the respective main support and a second member supported by the respective housing in registry with said first member, one of said members having a convex portion abutting against the other member, and a sleeve having internal threads of a first lead meshing with external threads of one of said members and external threads of a second lead meshing with second internal threads carried by the part supporting said externally threaded member.

16. A machine tool as defined in claim 15, wherein said one adjusting means further comprises a second sleeve provided with said second internal threads and affixed to said part.

17. A machine tool as defined in claim 16, wherein said one adjusting means further comprises a graduated scale on one of said sleeves.

18. A machine tool as defined in claim 1, wherein the spindles of said headstock are hollow and are rigid with the respective housing, said drive means comprising hollow shafts rotatably mounted in said hollow spindles, means for rotating said shafts, work-supporting chucks rotatable by said shafts, and actuating means extending through said hollow shafts and operative to move said chucks between work-engaging and work-releasing positions.

19. A machine tool as defined in claim 18, wherein said actuating means comprise rods extending through and movable axially with reference to said hollow shafts.

20. A machine tool as defined in claim 19, wherein said actuating means further comprises fluid-operated double-acting cylinder and piston means for moving said rods axially with reference to said hollow shafts.

21. A machine tool as defined in claim 2, wherein at least one of said adjusting means comprises a rotary member having first and second external threads of different leads, two internally threaded spherical members each meshing with one of said threads, and sockets for said spherical members, said sockets being provided in one of said main supports and in the corresponding housing.

22. A machine tool as defined in claim 21, wherein said one adjusting means further comprises a graduated scale provided on said rotary member between said spherical members.

23. A machine tool as defined in claim 22, wherein said one adjusting means further comprises a graduated index affixed to one of the parts including said last mentioned housing and the corresponding main support.

References Cited

UNITED STATES PATENTS

| | | | |
|---|---|---|---|
| 667,579 | 2/1901 | Roemisch | 51—105 |
| 1,502,990 | 7/1924 | Kiefer | 51—107 X |
| 2,054,985 | 9/1936 | Kraemer et al. | 51—101 |

HAROLD D. WHITEHEAD, Primary Examiner

U.S. Cl. X.R.

51—237; 90—15